US009666315B2

(12) United States Patent
Mizuguchi et al.

(10) Patent No.: US 9,666,315 B2
(45) Date of Patent: May 30, 2017

(54) METHOD FOR REPROCESSING SPENT NUCLEAR FUEL AND CENTRIFUGAL EXTRACTOR THEREFOR

(75) Inventors: Koji Mizuguchi, Kawasaki (JP); Reiko Fujita, Nerima-Ku (JP); Kouki Fuse, Ota-Ku (JP); Hitoshi Nakamura, Yokohama (JP); Kazuhiro Utsunomiya, Yokohama (JP); Nobuhiko Tanaka, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1183 days.

(21) Appl. No.: 12/533,605

(22) Filed: Jul. 31, 2009

(65) Prior Publication Data

US 2010/0038249 A1   Feb. 18, 2010

(30) Foreign Application Priority Data

Aug. 12, 2008  (JP) .................................. 2008-208194

(51) Int. Cl.
    *C02F 1/38*     (2006.01)
    *C25C 1/00*     (2006.01)
    (Continued)

(52) U.S. Cl.
    CPC .......... *G21C 19/46* (2013.01); *B01D 11/0434* (2013.01); *B01D 17/0217* (2013.01); *Y02W 30/883* (2015.05)

(58) Field of Classification Search
    CPC ..... C02F 1/38; C25C 1/00; C25C 7/00; C25B 15/00; B01D 17/0217
    (Continued)

(56) References Cited

U.S. PATENT DOCUMENTS 3,770,612 A * 11/1973 Gray et al. .................... 204/261
3,878,060 A    4/1975 Kroebel
(Continued)

FOREIGN PATENT DOCUMENTS

FR    2103460 A1    4/1972
GB     865778       4/1961
(Continued)

OTHER PUBLICATIONS

English Translation of JP 07-108104 to Harashina; Apr. 25, 1995.*
(Continued)

*Primary Examiner* — Zulmariam Mendez
(74) *Attorney, Agent, or Firm* — Oblon, McClelland, Maier & Neustadt, L.L.P.

(57) ABSTRACT

A spent nuclear fuel is reprocessed by dissolving a spent nuclear fuel in an aqueous nitric acid solution and separating and recovering nuclides contained in the resulting fuel solution by solvent extraction. A spent nuclear fuel reprocessing method includes: an electrolytic valence adjustment step in which nuclides contained in the fuel solution is electrolytically reduced without removing fission products or minor actinides until valence of plutonium is at a level at which solvent extraction efficiency is low by using the valence of plutonium contained in the fuel solution as a parameter; and a nuclide separation step in which, by using an extraction solvent which extracts uranium contained in the fuel solution, uranium is distributed from the fuel solution subjected to the electrolytic valence adjustment step to the extraction solvent.

6 Claims, 5 Drawing Sheets

(51) Int. Cl.
*C25C 7/00* (2006.01)
*C25B 15/00* (2006.01)
*G21C 19/46* (2006.01)
*B01D 11/04* (2006.01)
*B01D 17/02* (2006.01)

(58) Field of Classification Search
USPC .................................................. 204/233, 242
See application file for complete search history.

(56) References Cited

U.S. PATENT DOCUMENTS

| | | | |
|---|---|---|---|
| 4,012,480 A | | 3/1977 | Delvalle |
| 4,237,100 A | * | 12/1980 | Delvalle ........................... 423/6 |
| 5,190,623 A | * | 3/1993 | Sasaki .................... G21C 19/46 |
| | | | 204/228.1 |
| 2009/0184298 A1 | * | 7/2009 | Baron et al. .................. 252/638 |

FOREIGN PATENT DOCUMENTS

| | | |
|---|---|---|
| JP | 7-108104 | 4/1995 |
| JP | 7-313801 | 12/1995 |

OTHER PUBLICATIONS

Office Action issued Jan. 30, 2012 in Chinese Patent Application No. 200910167005.2.
Search Report dated Feb. 1, 2016 issued in corresponding French patent application No. FR0955604 (with English translation).

* cited by examiner

METHOD FOR REPROCESSING SPENT NUCLEAR FUEL AND CENTRIFUGAL EXTRACTOR THEREFOR

BACKGROUND OF THE INVENTION

Field of the Invention

The present invention generally relates to technologies for reprocessing spent nuclear fuels, and more particularly, to a method for reprocessing a spent nuclear fuel by dissolving a spent nuclear fuel in an aqueous nitric acid solution and separating and recovering nuclides contained in the resulting fuel solution through solvent extraction and also relates to a centrifugal extractor for use in this spent nuclear fuel reprocessing method.

Description of the Related Art

In recent years, use of atomic energy in many countries including Japan has been founded on use of nuclear fuel cycles that include reprocessing of spent nuclear fuels. The reprocessing of spent nuclear fuels is a process of chemically removing FP (fission product) and MA (minor nitride: e.g., Np, Am, Cm, etc.) from the spent nuclear fuels and separating and recovering U and Pu that are reusable in nuclear plants. The reprocessing of spent nuclear fuels not only plays an important part in effective use of energy resources but is also required to comply with demands of nuclear nonproliferation.

Various proposals of spent nuclear fuel reprocessing techniques have been made. A PUREX method, which is one type of solvent extraction method (e.g., refer to Patent Publication 1: Japanese Unexamined Patent Application Publication No. 9-318791), has become a representative reprocessing method due to its excellent selective recovery of U and Pu and nuclear criticality safety. According to a PUREX method, the process proceeds as follows: spent nuclear fuels (fuel assemblies) are chopped into pieces, the pieces are dissolved in nitric acid, the fission products are removed through a solvent extraction process (co-decontamination), the U and Pu are separated from each other through the solvent extraction process, the U is purified and blended with the Pu, the U solution and the U—Pu mixed solution are denitrated, and the U oxides and the U—Pu mixed oxides are produced.

According to existing spent nuclear fuel reprocessing methods, Pu contained in the spent nuclear fuel is ultimately recovered in the form of U—Pu mixed oxides which are then used as MOX fuels for light water reactors. In other words, the methods are designed to prevent ready use of Pu in an isolated form and thus have a certain effect of suppressing nuclear proliferation.

The reprocessing of the spent nuclear fuels through the solvent extraction process has been carried out with pulse column extractors (e.g., refer to Patent Publication 2: Japanese Unexamined Patent Application Publication No. 5-337304), mixer-settler extractors (e.g., refer to Patent Publication 3: Japanese Unexamined Patent Application Publication No. 6-246104), centrifugal extractors (e.g., refer to Patent Publication 4: Japanese Unexamined Patent Application Publication No. 7-108104), etc.

In the above conventional technology, the following matters have been revealed.

(1) The spent nuclear fuel reprocessing requires, from the nuclear management viewpoint, that the U is recovered at a high purity while ensuring that Pu does not exist in an isolated form. Since the existing spent nuclear fuel reprocessing methods include a step of separating U and Pu from each other, these methods are not satisfactory from the standpoint of nonproliferation. Moreover, although the final form of Pu that has been subjected to reprocessing is the U—Pu mixed oxide, highly radioactive FP have already been removed therefrom, thus remaining a risk that Pu could be recovered in an isolated form.

(2) In the devices used for the reprocessing of the spent fuel and including pulse column extractors equipped with partitions (i.e., baffles) inside, in order to increase the efficiency of extracting the nuclides contained in the fuel solutions with a solvent, it is important to increase the number of layers of baffles. Thus, compared to the centrifugal extractors, the pulse column extractors tend to be large in size.

In addition, the phase-separation of the mixed phase of fuel solutions and extraction solvents and the separation and recovery of fuel nuclides are carried out through a settling method by using differences in specific gravity. Thus, the processing rate of solvent extraction is low. This matter is also applied to the mixer-settler extractors which perform the separation of mixed phases and the separation and recovery of fuel nuclides using the settlement method. If the processing rate of the solvent extraction is low, the radiation degradation of the extraction solvents will become severe. Accordingly, in the reprocessing of the spent nuclear fuel with a high radioactive level, such as spent nuclear fuel discharged from a high burn-up reactor and a fast reactor, the lifetime of the extraction solvents tends to be shorter for the mixer-settler extractors in comparison with the use of the centrifugal extractors.

SUMMARY OF THE INVENTION

The present invention has been conceived in consideration of the circumstance (1) mentioned above, and a first object of the present invention is to provide a method for reprocessing a spent nuclear fuel by which high-purity uranium can be recovered without a step of isolating plutonium from the spent nuclear fuel. In addition, the method renders it difficult to isolate and recover reprocessed plutonium and achieves high proliferation suppressing effects.

Another object of the present invention made in consideration of the circumstance (2) mentioned above, is to provide a centrifugal extractor that can recover high-purity uranium without a step of isolating plutonium from a spent nuclear fuel, renders it difficult to isolate and recover the reprocessed plutonium, has high proliferation suppressing effects, achieves size-reduction, and reduces degradation of the extraction solvent.

These and other objects of the present invention can be achieved by providing, in one aspect, a method for reprocessing a spent nuclear fuel by dissolving a spent nuclear fuel in an aqueous nitric acid solution and separating and recovering nuclides contained in the resulting fuel solution by solvent extraction, the method comprising:

an electrolytic valence adjustment step in which nuclides contained in the fuel solution is electrolytically reduced without removing fission products or minor actinides until valence of plutonium is at a level at which solvent extraction efficiency is low by using the valence of plutonium contained in the fuel solution as a parameter; and a nuclide separation step in which, by using an extraction solvent which extracts uranium contained in the fuel solution, uranium is distributed from the fuel solution subjected to the electrolytic valence adjustment step to the extraction solvent.

In the above aspect, it may be desired that, in the electrolytic valence adjustment step, the nuclides contained in the fuel solution are electrolytically reduced until the valence of plutonium becomes 3, and in the nuclide separation step, an organic solvent containing tributyl phosphate diluted with dodecane is used as the extraction solvent.

It may be also desired that, in the nuclide separation step, a centrifugal extraction technique is employed to centrifugally separate the fuel solution subjected to the electrolytic valence adjustment step from the extraction solvent and the uranium is distributed to the separated extraction solvent.

In another aspect of the present invention, there is provided a centrifugal extractor comprising:

a centrifugal extraction unit; and an electrolytic reduction unit, wherein the centrifugal extraction unit includes a main body casing forming an outer shell, and a rotor casing housed in the main body casing and configured to centrifugally conduct phase-separation of a mixture of a fuel solution obtained by dissolving a spent nuclear fuel in an aqueous nitric acid solution and an extraction solvent for extracting nuclides contained in the fuel solution, in which a space is defined by a bottom wall of the main body casing and a bottom wall of the rotor casing to be used as a mixing space where the fuel solution is mixed with the extraction solvent, and wherein the electrolytic reduction unit is configured such that the fuel solution containing fission products and minor actinides is guided to the electrolytic reduction unit and to electrolytically reduce nuclides contained in the guided fuel solution until valence of plutonium contained in the fuel solution is at a level at which the solvent extraction efficiency is low and to feed the electrolytically reduced fuel solution to the rotor casing.

In this aspect, the following embodiments may be provided.

The electrolytic reduction unit may be configured to electrolytically reduce the nuclides contained in the fuel solution until the valence of plutonium contained in the fuel solution is 3, and the centrifugal extraction unit may be configured such that the electrolytically reduced fuel solution and an organic solvent that contains tributyl phosphate diluted with dodecane and serves as the extraction solvent are fed to the mixing space.

The centrifugal extraction unit may be configured to perform centrifugal extraction at a rotation rate of the rotor casing of 1000 rpm or more and a flow rate at which the fuel solution and the extraction solvent are fed to the rotor casing of 0.2 L/min or more. The centrifugal extraction unit may be configured to perform centrifugal extraction at a rotation rate of the rotor casing of 4000 rpm or more and a flow rate at which the fuel solution and the extraction solvent are fed to the rotor casing of 0.4 L/min or more.

It may be desired that the electrolytic reduction unit includes: an electrolytic reduction vessel which is disposed outside the main body casing of the centrifugal extraction unit and into which the fuel solution is introduced; a partition member that prevents passing of electrolytically reduced plutonium and allows passing of the aqueous nitric acid solution, the partition member being disposed inside the electrolytic reduction vessel; and an anode chamber housing an anode and a cathode chamber housing a cathode that are separated by the partition member from each other, so that the fuel solution is introduced into the cathode chamber to perform an electrolytical reduction.

The electrodes of the electrolytic reduction unit may be composed of or coated with at least one metal selected from the group consisting of gold, platinum, titanium, ruthenium, rhodium, and palladium, an alloy of two or more of the metals thereof, or glassy carbon. It may be desired that the partition member of the electrolytic reduction unit is composed of an organic polymer material or a ceramic material.

It may be also desired that the electrolytic reduction unit includes: an electrolytic reduction vessel which serves as the mixing space of the centrifugal extraction unit; and electrodes for electrolytically reducing the nuclides contained in the fuel solution fed to the mixing space serving as the electrolytic reduction vessel.

The electrodes of the electrolytic reduction unit may be disposed in the mixing space and are ring-shaped electrodes including anodes and cathodes concentrically and alternately arranged.

The electrodes of the electrolytic reduction unit may include an anode constituted by one of the main body casing and the rotor casing of the centrifugal extraction unit that is positively charged, and a cathode constituted by the other of the main body casing and the rotor casing of the centrifugal extraction unit that is negatively charged.

According to the present invention, high-purity uranium can be recovered without a step of isolating plutonium from a spent nuclear fuel. In addition, isolation and recovery of the reprocessed plutonium become difficult and a high proliferation suppressing effect is achieved.

The nature and further characteristic features of the present invention will be made clearer from the following descriptions made with reference to the accompanying drawings.

DESCRIPTION OF THE PREFERRED EMBODIMENTS

Embodiments of a method for reprocessing a spent nuclear fuel and a centrifugal extractor for use therefor according to the present invention will now be described hereunder with reference to the accompanying drawings.

The spent nuclear fuel reprocessing method of this embodiment will be described hereunder with reference to the flowchart of FIG. 1.

This spent nuclear fuel reprocessing method is based on the PUREX method in which a spent nuclear fuel discharged from a reactor is dissolved in an aqueous nitric acid solution and nuclides contained in the resulting fuel solution are separated and recovered by solvent extraction.

Figure 1:
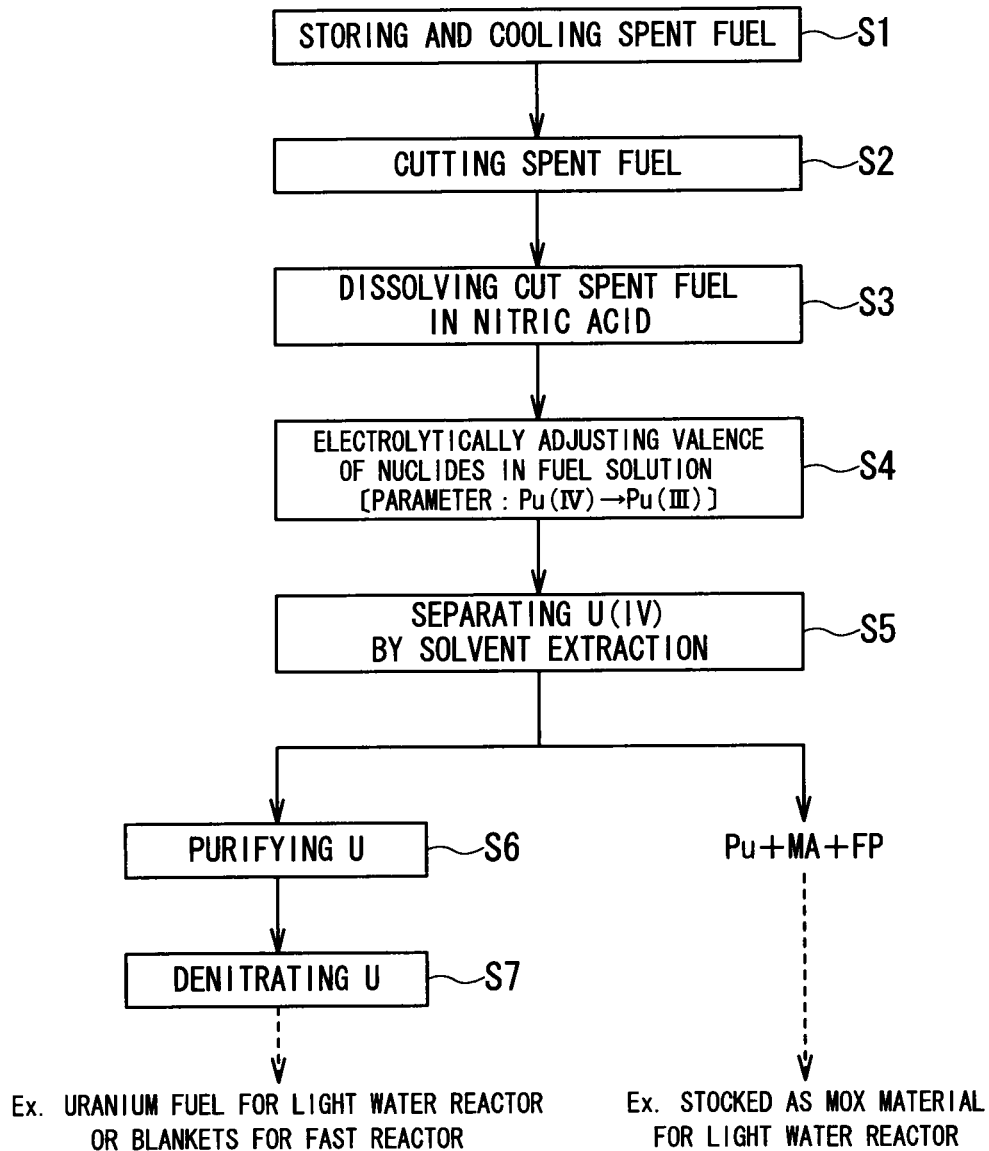
FIG. 1 is a flowchart representing a first embodiment of a method for reprocessing a spent nuclear fuel according to the present invention.

With reference to FIG. 1, each of the steps of this reprocessing method is described below.

Step S1 is a step of storing and cooling a spent nuclear fuel discharged from a reactor in a storage pool until the radioactivity level of the spent nuclear fuel decreases to a particular level.

Step S2 is a step of cutting the spent nuclear fuel (fuel assembly) stored and cooled in the step S1 into pieces about several centimeters in size. FP (fission product) gas released from fuel rods and the like during cutting is subjected to waste gas processing.

Step S3 is a step of placing the pieces of the spent nuclear fuel cut in the step S2 in a stainless-steel dissolution vessel and dissolving the pieces in an aqueous nitric acid solution to elute U, Pu, FP, MA (Np, Am, Cm, etc.), and the like in the aqueous nitric acid solution. Pieces of zircalloy or stainless-steel fuel cladding ducts and other fuel assembly structures are insoluble in the aqueous nitric acid solution and are treated and disposed of as solid radioactive wastes. The steps S1 to S3 may be carried out through techniques common in the PUREX method.

Step S4 is a step (electrolytic valence adjustment step) of electrolytically reducing each of the dissolved nuclides in the fuel solution until the valence of Pu is at a level at which efficiency of the solvent extraction performed in step S5 becomes low. This electrolytic valence adjustment step is performed with respect to a fuel solution containing FP and MA.

Step S5 is a step of selectively distributing U from the fuel solution subjected to the step S4 to an extraction solvent capable of efficiently extracting U from the fuel solution while allowing Pu and other dissolved nuclides to remain in the fuel solution. In other words, the step S5 is a step of separating and recovering U from Pu and other nuclides (FP, MA, etc.) (nuclide separation step). Note that a mixture of Pu and other nuclides is stocked as a row material for MOX fuels for a light water reactor use.

Step S6 is a step of removing trace amounts of FP and the like distributed to the extraction solvent to purify U.

Step S7 is a step of denitrating the purified U solution, which is obtained in the step S6, by microwave irradiation or the like. The steps S6 and S7 may be performed by employing known techniques used in the PUREX method. After the step S7, the U in oxide form is stocked and used as fuels for light water reactors or fast reactor blankets.

Specific examples of the steps S4 and S5 in the method for reprocessing the spent nuclear fuel according to this embodiment will be described hereunder.

In the nuclide separation step or step S5, an organic solvent containing TBP (tributyl phosphate) diluted with dodecane is used as the extraction solvent (hereinafter this organic solvent is referred to as "TBP solvent"). This is because U contained in the fuel solution obtained in the step S3 is hexavalent and the distribution coefficient of hexavalent U (U(VI)) between the TBP and the aqueous nitric acid solution is significantly high. Dilution of TBP with dodecane is controlled so that the TBP concentration becomes 30%, for example.

In the nuclide separation step or step S5, U is separated from Pu and other dissolved nuclides and recovered by a centrifugal extraction method.

The centrifugal extraction method includes a solvent extraction process and a phase separation process. In the solvent extraction process, the fuel solution that has been subjected to the electrolytic valence adjustment in the step S4 is mixed with a TBP solvent to distribute U to the TBP solvent while allowing Pu to remain in the fuel solution. In the phase separation process that follows the solvent extraction process, the mixture of the fuel solution and the TBP solvent is subjected to phase separation by centrifugal force to separate U in the TBP solvent from Pu and other dissolved nuclides in the fuel solution and recover U and Pu and other nuclides.

Pu contained in the fuel solution obtained in the step S3 is tetravalent. The distribution coefficient of tetravalent Pu (Pu(IV)) between the TBP solvent and the aqueous nitric acid solution is 20, which is significantly different from that of trivalent Pu (Pu(III)), which is 0.01. Thus, Pu(IV) is stable in the TBP solvent and Pu(III) is stable in the aqueous nitric acid solution.

In the step S4, the valence of Pu is adjusted by electrolytic reduction so that, in the step S5 for distributing U to the TBP solvent on the basis of the difference in distribution coefficient derived from the valence of Pu, Pu remains in the fuel solution. In other words, in the step S4, the valence of Pu contained in the fuel solution is electrolytically adjusted to 3.

The electrolytic valence adjustment of the step S4 is performed on the fuel solution containing FP and MA. Thus, the dissolved nuclides other than the Pu, for example, U, Np, Am, and Cm, are also electrolytically reduced. During this process, since the electrolytic reduction operation is conducted to adjust the valence of Pu contained in the fuel solution to be 3, not only a reduction reaction of Pu(IV) →Pu(III) but also reduction reactions of U(VI)→(IV) and Np(VI)→(V) occur. It is known that when electrolytic valence adjustment is conducted in this way, most U in the fuel solution exists as U(VI) and most of Np exists as Np(V) due to the stoichiometry of the fuel solution based on a typical composition of the spent nuclear fuel.

When the electrolytic valence adjustment of the step S4 is performed, Pu(III) and Np(V) contained in the fuel solution produced by the electrolytic reduction are not distributed to the TBP solvent but remain in the fuel solution in the nuclide separation step of step S5. Moreover, since the fuel solution is not subjected to decontamination for removing FP and MA, FP and MA partly remain in the fuel solution. In contrast, U(IV) produced by electrolytic reduction in the step S4 and U(VI) remained unreduced, have high distribution coefficients for the TBP solvent and are satisfactorily distributed to the TBP solvent.

Next, a centrifugal extractor used in the method for reprocessing the spent nuclear fuel according to the above-mentioned embodiment will be described.

Figure 2:
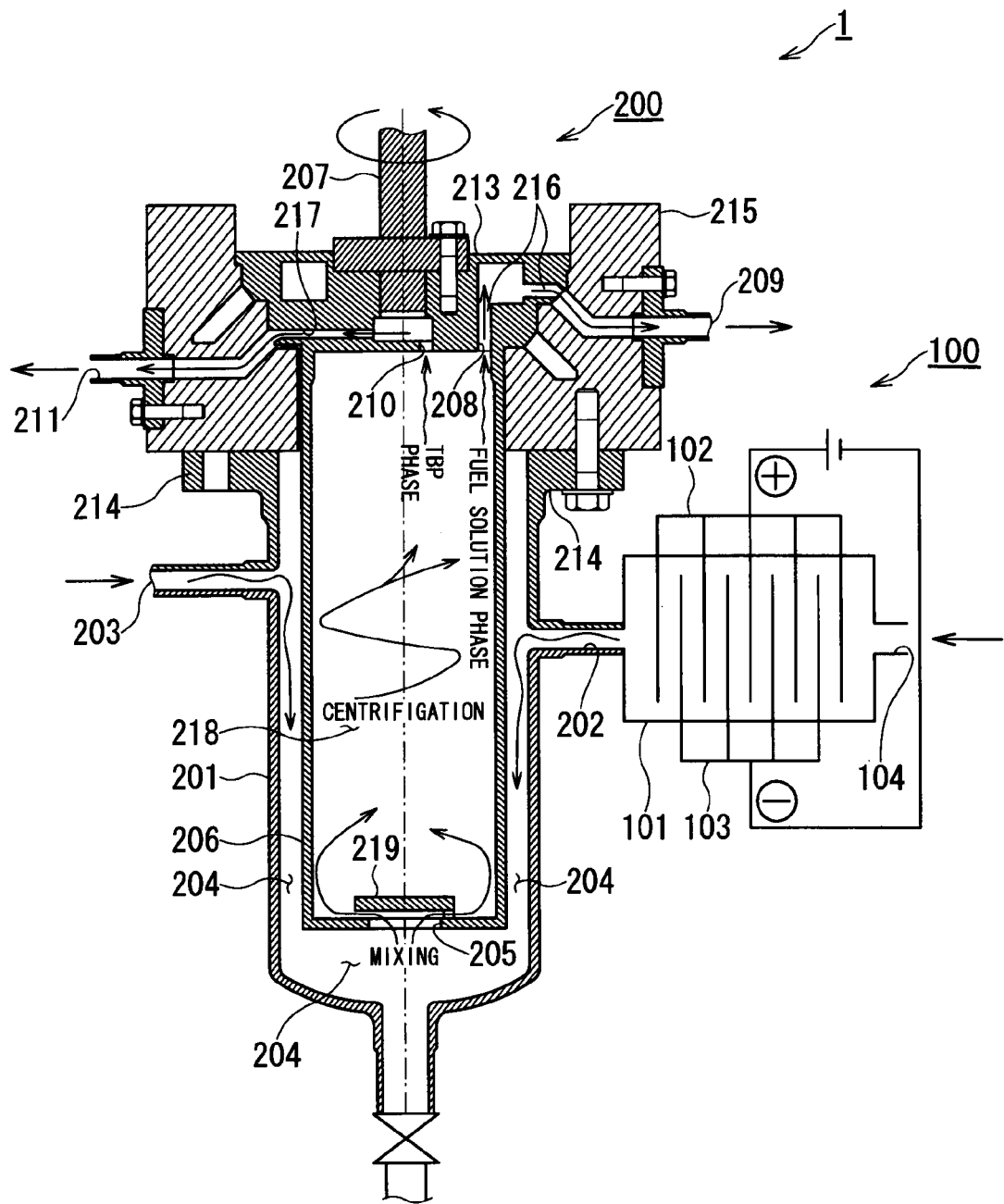
FIG. 2 shows a first embodiment of a centrifugal extractor according to the present invention.

FIG. 2 is a vertical cross-sectional view showing a first embodiment of the centrifugal extractor according to the present invention.

As shown in FIG. 2, a centrifugal extractor 1 of this embodiment includes an electrolytic reduction unit 100 and a centrifugal extraction unit 200.

The electrolytic reduction unit 100 of the centrifugal extractor 1 is connected to the centrifugal extraction unit 200. The electrolytic reduction unit 100 includes an electrolytic reduction vessel 101, electrodes (anode 102 and cathode 103), and a fuel solution inlet 104.

The fuel solution inlet 104 of the electrolytic reduction unit 100 is connected to a transfer canal through which the fuel solution obtained in the step S3, i.e., a fuel solution containing FP and MA, is transferred.

The electrolytic reduction vessel 101 of the electrolytic reduction unit 100 contains electrodes (anode 102 and cathode 103). In the electrolytic reduction vessel 101, the dissolved nuclides contained in the fuel solution fed from the fuel solution inlet 104 are respectively electrolytically reduced until the valence of dissolved Pu becomes 3. The dissolved nuclides in the fuel solution flow while being electrolytically reduced inside the electrolytic reduction vessel 101 and are guided to a fuel solution feed port 202 provided in the centrifugal extraction unit 200.

The electrodes in the electrolytic reduction vessel 101 are composed of platinum having high corrosion resistance against the aqueous nitric acid solution. The material for the electrodes is, however, not limited to platinum and may be any material exhibiting high corrosion resistance against the aqueous nitric acid solution. Examples of the material for the electrodes include metals such as gold, titanium, ruthenium, rhodium and palladium, alloys of two or more of the aforementioned metals, and glassy carbon. When electrodes are to be made of a material that has low corrosion resistance against nitric acid, the electrodes may be coated with platinum or the like.

The centrifugal extraction unit 200 of the centrifugal extractor 1 includes the fuel solution feed port 202 from which the fuel solution that has passed through the electrolytic reduction vessel 101 is fed, an extraction solvent feed port 203 from which the TBP solvent is fed, and a bottomed cylindrical main body casing 201 that constitutes the outer shell of the extractor. A mixing space 204 defined by the inner wall of the main body casing 201 and the outer wall of a rotor casing 206 is formed inside the main body casing 201. The fuel solution is mixed with the TBP solvent in this mixing space 204.

The rotor casing 206 has a mixed solution inlet 205. While the rotor casing 206 is being rotated, the mixed solution is taken into a centrifugal separation vessel 218 from the mixed solution inlet 205 and subjected to phase separation in the centrifugal separation vessel 218 by the centrifugal force. The centrifugal separation vessel 218 is equipped with a baffle 219. The mixed solution taken into the centrifugal separation vessel 218 is dispersed by the baffle 219 to accelerate the mixing.

The rotor casing 206 is integral with a rotating plug 213 and is rotated in accordance with the rotation of the rotating plug 213. The rotating plug 213 is connected to a rotating shaft 207 that is rotated by a rotational drive force produced by an external drive source, not shown. The rotating plug 213 is rotatably supported on a supporting plug 215 affixed on an external peripheral flange 214 of the main body casing 201.

The rotating plug 213 integral with the rotor casing 206 has a high-density-phase outlet 208 through which the fuel solution (high-density phase) separated from the TBP solvent by the centrifugal force is discharged from the rotor casing 206, and a low-density-phase outlet 210 through which the TBP solvent (low-density phase) separated from the fuel solution likewise is discharged from the rotor casing 206. The high-density-phase outlet 208 is formed near the outer periphery of the rotating plug 213 and the low-density-phase outlet 210 is formed near the center of the rotating plug 213.

The supporting plug 215 that rotatably supports the rotating plug 213 has a high-density-phase discharge channel 209 inside. The fuel solution discharged form the rotor casing 206 through the high-density-phase outlet 208 is guided to the exterior of the centrifugal extraction unit 200 through the high-density-phase discharge channel 209. The supporting plug 215 also has a low-density-phase discharge channel 211 inside. The TBP solvent discharged from the rotor casing 206 through the low-density-phase outlet 210 is guided to the exterior of the centrifugal extraction unit 200 through the low-density-phase discharge channel 211. The rotating plug 213 has a high-density phase guiding channel 216 that connects the high-density-phase outlet 208 to the high-density-phase discharge channel 209 and a low-density phase guiding channel 217 that connects the low-density-phase outlet 210 to the low-density-phase discharge channel 211.

A method for reprocessing a spent nuclear fuel and operation of the centrifugal extractor of the described embodiment will be described hereunder.

The dissolved nuclides in the fuel solution subjected to electrolytic reduction in the electrolytic reduction unit 100 of the centrifugal separator 1 are fed to the interior of the main body casing 201 of the centrifugal extraction unit 200 from the fuel solution feed port 202 of the centrifugal extraction unit 200. The TBP solvent is fed to the interior of the main body casing 201 of the centrifugal extraction unit 200 from the extraction solvent feed port 203 of the centrifugal extraction unit 200. The feed flow rate of the fuel solution and the TBP solvent is set by taking into account the nuclide separation efficiency for solvent extraction and is preferably 0.2 L/min or more and more preferably 0.4 L/min or more.

The fuel solution and TBP solvent fed to the interior of the main body casing 201 of the centrifugal extraction unit 200 are merged and mixed with each other in the mixing space 204. In the mixing space 204, the dissolved nuclides are extracted with the solvent through the reaction between the fuel solution and the TBP solvent in the mixed solution. In other words, the U(VI) in the fuel solution that has not been electrolytically reduced in the electrolytic reduction unit 100 and the U(IV) electrolytically reduced are distributed to the TBP solvent in accordance with the distribution coefficients thereof, respectively. The Pu(III), Np(V), other MA, FP, etc., in the fuel solution subjected to electrolytic reduction in the electrolytic reduction unit 100 remain in the fuel solution. The mixed solution including two phases, i.e., the fuel solution and the TBP solvent, to which the nuclides have been distributed is guided to the interior of the rotor casing 206 from the mixed solution inlet 205 of the centrifugal extraction unit 200.

The guided two-phase mixed solution in the rotor casing 206 of the centrifugal extraction unit 200 is centrifuged by the rotation of the rotor casing 206 and separated into the fuel solution phase and the TBP phase in accordance with the difference in specific gravity. During this process, in the rotor casing 206, a fuel solution phase having a high density is formed at the inner wall side of the rotor casing 206, and a TBP solvent phase having a low density is formed at the center of the rotor casing 206.

The rotation rate of the rotor casing 206 is set by considering the nuclide separation efficiency achieved by the solvent extraction. The rotation rate is preferably 100 rpm to 3500 rpm or more. A higher rotation rate is more preferable. The rotation rate of the rotor casing 206 is more preferably 4000 rpm or more. The flow rate at which the fuel solution and the TBP solvent are supplied to the rotor casing 206 is set by considering the nuclide separation efficiency achieved by solvent extraction. The flow rate is preferably 0.2 L/min or more and more preferably 0.4 L/min or more.

When the solvent extraction and the phase separation are conducted by setting the flow rate at which the fuel solution and the TBP solvent are fed to the centrifugal extractor 1 to 0.2 L/min and setting the rotation rate of the rotor casing 206 to 1000 rpm, 90% of the U(VI) and U(IV) are separated and recovered, and 90% of Pu(III) is separated and recovered. When the solvent extraction and phase separation are conducted by setting the flow rate to 0.4 L/min and the rotation rate of the rotor casing 206 to 4000 rpm, about 100% of U(VI) and U(IV) are separated and recovered, and 90% of Pu(III) is separated and recovered.

Among the solution phases in the rotor casing 206, the fuel solution phase containing remnant Pu, FP, MA, etc., passes through the high-density-phase outlet 208, is discharged through the high-density-phase discharge channel 209, and is recovered. The TBP solvent phase to which the U has been distributed passes through the low-density-phase outlet 210, is discharged through the low-density-phase discharge channel 211, and is recovered.

According to existing methods for reprocessing the spent nuclear fuels, the pieces of spent nuclear fuels are dissolved in an aqueous nitric acid solution to form a fuel solution and the FP having a high level of radioactivity is removed from the fuel solution (co-decontamination). Subsequently, the reprocessing is conducted by a step of separating U and Pu from each other, purifying U and denitrating U, and a step of re-mixing the U and Pu and denitrating the mixture of U and Pu. The latter step is necessary for nonproliferation. However, since a step of "separating U and Pu from each other" is included in the reprocessing process, Pu is present in an isolated form. Furthermore, since the "co-decontamination" step is included, the isolation of Pu from the U—Pu mixture is relatively easy. Thus, there is a risk that Pu could be used alone.

In contrast, according to the method for reprocessing the spent nuclear fuel of this embodiment, the U is separated from the Pu and other nuclides by conducting neither the co-decontamination nor the separation of the U and the Pu from each other throughout the process. Moreover, the purity of the U is 90% to 100%. In other words, the U in an isolated form can be recovered at high purity and the Pu can be stored together with FP and MA while retaining a highly radioactive state until it is reused, thereby rendering it difficult to extract and purify Pu only.

The method for reprocessing the spent nuclear fuel and the centrifugal extractor 1 of this embodiment will advantageously attain the following effects and functions.

(1) The method for reprocessing the spent nuclear fuel of this embodiment includes an electrolytic valence adjustment step that uses the valence of Pu contained in the fuel solution as a parameter, the step including electrolytically reducing dissolved nuclides contained in the fuel solution without removing FP or MA until the valence of plutonium is 3, and a nuclide separation step that uses the TBP solvent, the step including distributing Pu to the TBP solvent from the fuel solution subjected to the electrolytic valence adjustment step. Thus, high-purity uranium can be recovered without performing a step of isolating plutonium from the spent nuclear fuel, the isolation and recovery of reprocessed plutonium become difficult, and the spent nuclear fuel can be processed while highly suppressing proliferation.

(2) In the centrifugal extractor 1, the electrolytic reduction unit 100 is configured such that the fuel solution containing FP and MA can be guided into the electrolytic reduction unit 100 and dissolved nuclides contained in the fuel solution can be electrolytically reduced until the valence of Pu contained in the fuel solution is 3. The centrifugal extraction unit 200 is configured such that the fuel solution electrolytically reduced in the electrolytic reduction unit 100 and the TBP solvent serving as an extraction solvent can be fed into the mixing space 204. Thus, high-purity uranium can be recovered without performing a step of isolating plutonium from the spent nuclear fuel, the isolation and recovery of reprocessed plutonium become difficult, and the spent nuclear fuel can be processed while highly suppressing proliferation.

In the devices used in solvent extraction methods such as PUREX methods, the centrifugal extractors achieve a higher processing rate of solvent extraction than the mixer-settler extractors and the pulse column extractors and can reduce radioactive degradation of the organic solvent. Thus, when the reprocessing method of this embodiment not including the co-decontamination process is implemented with the centrifugal extractors, both enhancement of the effect of suppressing proliferation and slowing the degradation of the extraction solvent can be achieved.

(3) The centrifugal extraction unit 200 may be configured such that when the rotation rate of the rotor casing 206 is 4000 rpm or more and the flow rate at which the fuel solution and the TBP solvent are fed to the rotor casing 206 is 0.4 L/min or more, the centrifugal extraction can be performed. Uranium having a purity of 100% or near can be separated and recovered, and the effect described in paragraph (2) can be further enhanced.

Figure 3:
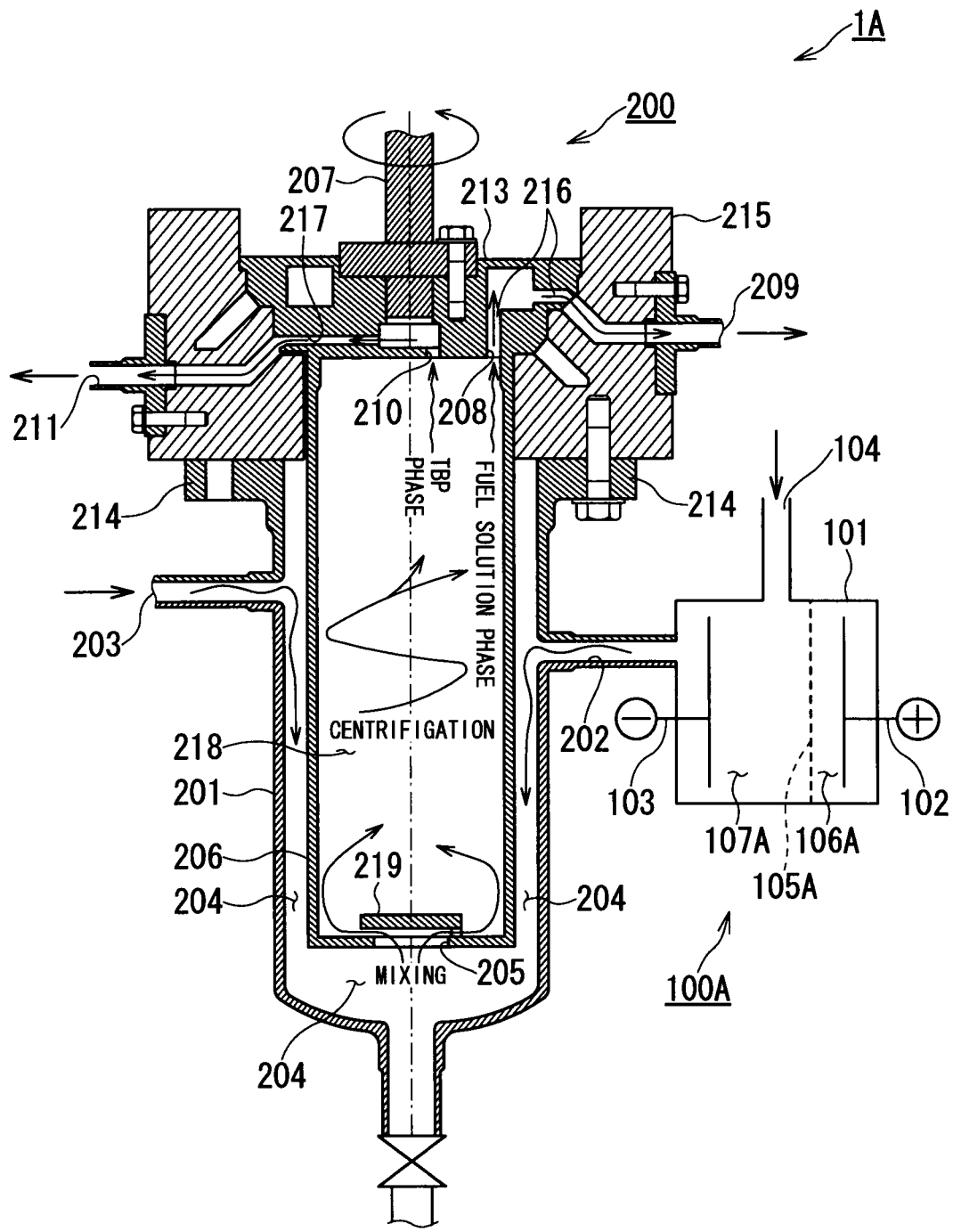
FIG. 3 shows a second embodiment of a centrifugal extractor according to the present invention.

FIG. 3 is a vertical cross-sectional view showing a second embodiment of the centrifugal extractor according to the present invention.

The second embodiment is an example in which the structure of the electrolytic reduction unit 100 of the centrifugal extractor 1 of the first embodiment may be modified. The structures identical to those of the first embodiment shown in FIG. 2 are represented by the same reference characters and the descriptions therefor are omitted. The structures modified from the first embodiment and newly added structures are represented by corresponding reference characters followed by letter "A" and described.

A centrifugal extractor 1A of this second embodiment includes an electrolytic reduction unit 100A, as shown in FIG. 3. The electrolytic reduction unit 100A includes a partition 105A, an anode chamber 106A housing an anode 102 and a cathode chamber 107A housing a cathode 103, both chambers 106A and 107A being separated by the partition 105A. Further, it is to be noted that in the electrolytic reduction unit 100A, a fuel solution inlet 104 is formed in the cathode chamber 107A, the fuel solution is introduced into the cathode chamber 107A, and the dissolved nuclides contained in the fuel solution are electrolytically reduced.

It is a matter of important that the partition 105A of the electrolytic reduction unit 100A prevents passing of electrolytically reduced Pu while allowing passing of the aqueous nitric acid solution, and has a high corrosion resistance against the aqueous nitric acid solution. Thus, the partition 105A is preferably formed of a porous member composed of an organic polymer material or a ceramic material.

The centrifugal extractor 1A will attain the following advantageous effects and functions in addition to the effects and functions described in (2) and (3) of the first embodiment.

(4) The electrolytic reduction unit 100A is provided with the partition 105A that prevents the passing of Pu electrolytically reduced in the electrolytic reduction vessel 101 and allows the passing of the aqueous nitric acid. Thus, oxidation of Pu(III) produced by electrolytic reduction is suppressed, and the effects described in (2) and (3) of the first embodiment can be enhanced.

Figure 4A:
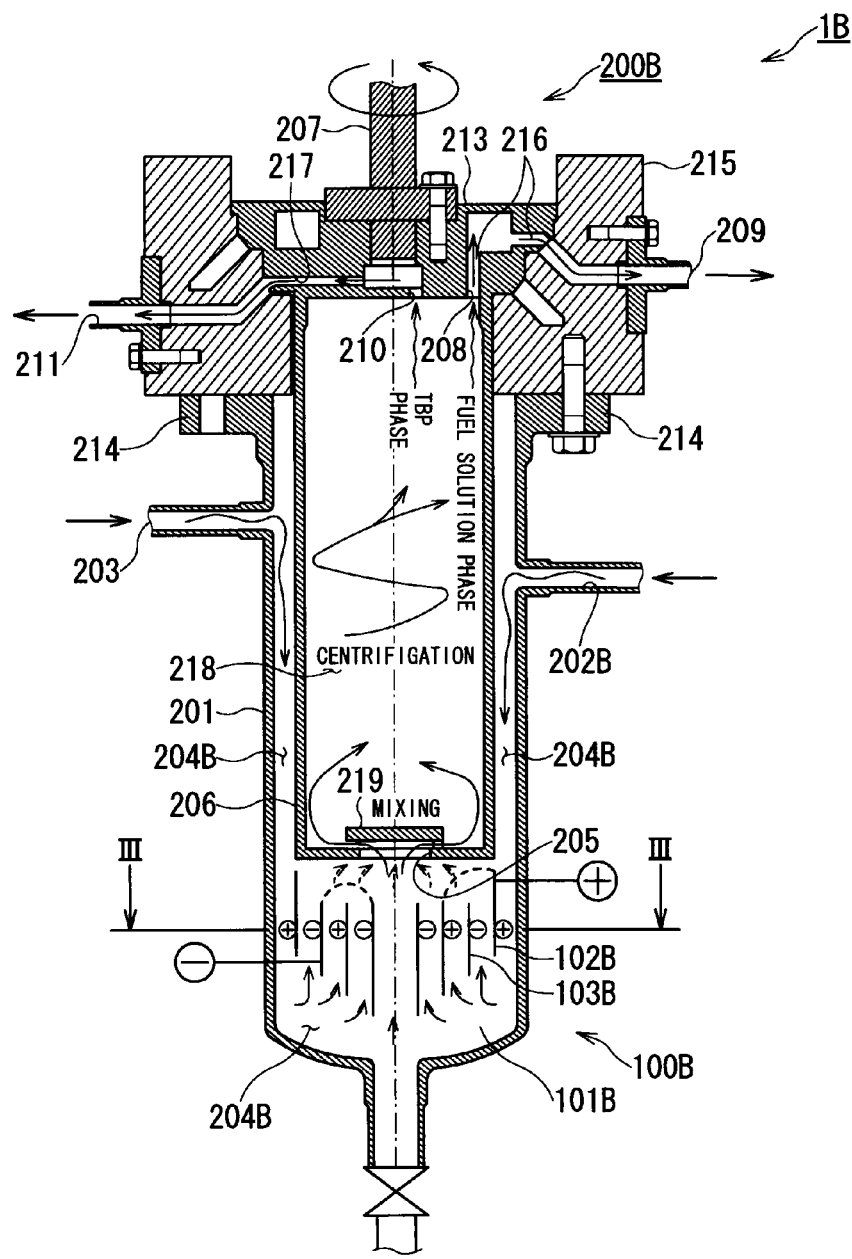
FIGS. 4A and 4B are, respectively, a vertical cross-sectional view and a cross-sectional view taken along line III-III in FIG. 4A of a third embodiment of a centrifugal extractor according to the present invention.
Figure 4B:
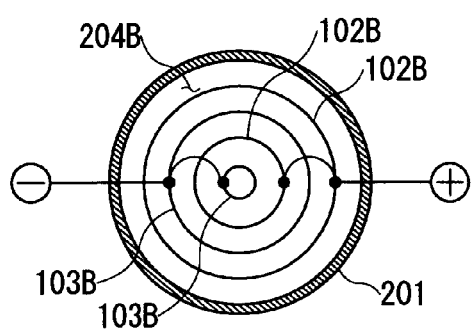

FIGS. 4A and 4B show a third embodiment of the centrifugal extractor according to the present invention. FIG. 4A is a vertical cross-sectional view of a centrifugal extractor and FIG. 4B is a cross-sectional view taken along line III-III in FIG. 4A.

The third embodiment is another example in which the structure of the electrolytic reduction unit 100 of the centrifugal extractor 1 of the first embodiment may be modified. The structures identical to those of the first embodiment are represented by the same reference characters and the descriptions therefor are omitted. The structures modified from the first embodiment and newly added structures are represented by corresponding reference characters followed by letter "B" and described.

A centrifugal extractor 1B of this third embodiment includes an electrolytic reduction unit 100B that includes an anode 102B, a cathode 103B, a fuel solution feed port 202B, and a mixing space 204B (electrolytic reduction vessel 101B), as shown in FIG. 4A. In other words, the centrifugal extractor 1B of this third embodiment is constituted by the centrifugal extraction unit 200 and the electrolytic reduction unit 100 of the first embodiment, which are partially integrated with each other in structures. In particular, the fuel solution feed port 202B and the mixing space 204B of the centrifugal extraction unit 200B also respectively function as the fuel solution inlet 104 and the electrolytic reduction vessel 101 of the electrolytic reduction unit 100 of the first embodiment.

As shown in FIGS. 4A and 4B, the electrodes (anodes 102B and cathodes 103B) of the electrolytic reduction unit 100B are disposed in the mixing space 204B functioning as an electrolytic reduction vessel 101B. Multiple anodes 102B and cathodes 103B are concentrically and alternately arranged in the mixing space 204B. Each electrode has a ring shape. The shape of the electrode can be appropriately changed depending on the shape of the mixing space 204B, and the number of electrodes can be appropriately changed according to the electrolytic reduction efficiency.

The centrifugal extractor 1B can achieve the following effects and functions in addition to those (2) and (3) of the first embodiment mentioned above.

(5) The electrolytic reduction unit 100B includes the electrolytic reduction vessel 101B that also functions as the mixing space 204B of the centrifugal extraction unit 200B, and the electrodes (anodes 102B and cathodes 103B) used for electrolytic reduction of the fuel solution fed to the mixing space 204B serving as the electrolytic reduction vessel 101B. In other words, the fuel solution can be electrolytically reduced by utilizing the mixing space 204B necessary for the centrifugal extraction unit 200B to mix the fuel solution with the extraction solvent. Accordingly, the electrolytic reduction vessel 101 and the fuel solution inlet 104 provided in the electrolytic reduction unit 100 of the first embodiment are not needed, and size reduction and simplification of the centrifugal extractor can be achieved in addition to the effects described in (2) and (3) of the first embodiment.

Figure 5:
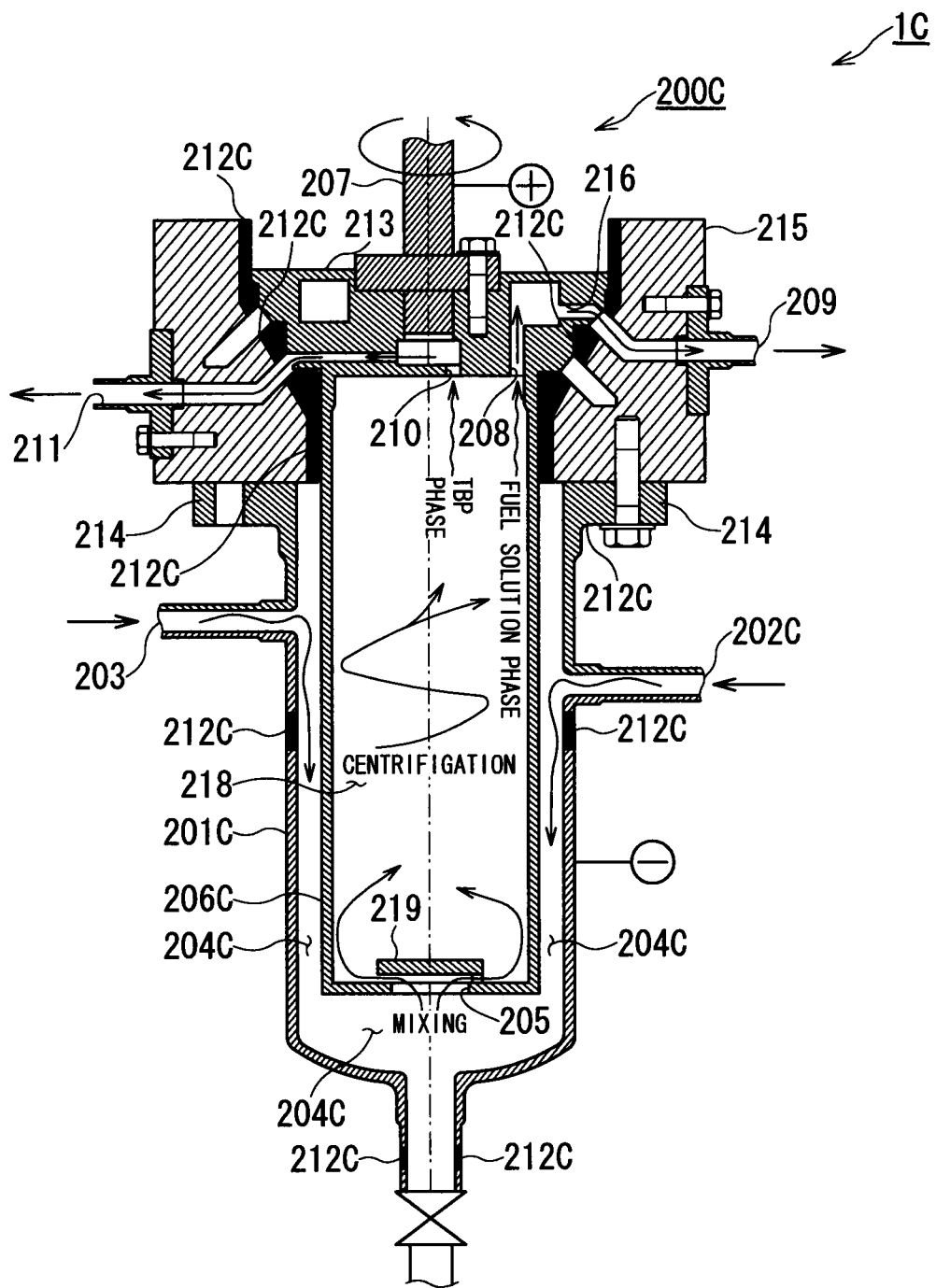
FIG. 5 shows a fourth embodiment of a centrifugal extractor according to the present invention.

FIG. 5 is a vertical cross-sectional view showing a fourth embodiment of the centrifugal extractor of the present invention. The fourth embodiment is yet another example in which the structure of the electrolytic reduction unit 100 of the centrifugal extractor 1 of the first embodiment may be modified. The structures identical to those of the first embodiment are represented by the same reference characters and the descriptions therefor are omitted. The structures modified from the first embodiment and newly added structures are represented by corresponding reference characters followed by letter "C" and described.

A centrifugal extractor 1C of this fourth embodiment includes an electrolytic reduction unit that includes a main body casing 201C, a fuel solution feed port 202C, a mixing space 204C, a rotor casing 206C, and an insulating member 212C. In the centrifugal extractor 1C, the electrolytic reduction unit 100 and the centrifugal extraction unit 200 of the first embodiment are structurally integrated. In other words, the fuel solution feed port 202C, the mixing space 204C, the rotor casing 206C, and the main body casing 201C of a centrifugal extraction unit 200C also respectively function as the fuel solution inlet 104, the electrolytic reduction vessel 101, the anode 102, and the cathode 103 of the electrolytic reduction unit 100 of the first embodiment.

The main body casing 201C of the centrifugal extractor 1C is negatively charged so that it functions as a cathode, and the rotor casing 206C of the centrifugal extractor 1C is positively charged so that it functions as an anode. The insulating member 212C is disposed at an adequate position to prevent short circuits between the main body casing 201C and the rotor casing 206C so that the main body casing 201C and the rotor casing 206C can keep function as the electrodes. Alternatively, the main body casing 201C may be positively charged to function as an anode and the rotor casing 206C may be negatively charged to function as a cathode. In the centrifugal extractor 1C, electrolytic reduction is performed in the mixing space 204C.

The centrifugal extractor 1C can achieve the following effects and functions in addition to those described in (2) and (3) of the first embodiment.

(6) The electrolytic reduction unit (including 201C, 202C, 204C, 206C, and 212C) is structurally integrated with the centrifugal extraction unit 200C. In other words, the centrifugal extraction unit 200C is configured to also function as the electrolytic reduction unit 100 of the first embodiment. Thus, there is no need to separately provide the electrolytic reduction unit 100 of the first embodiment, and size reduction and simplification of the centrifugal extractor can be achieved in addition to the effects described in (2) and (3) of the first embodiment.

It is to be noted that the present invention is not limited to the described embodiments and many other changes and modifications may be made without departing from the scopes of the appended claims.

What is claimed is:

1. An apparatus for separating uranium ("U") from plutonium ("Pu"), fission products ("FP"), neptunium ("Np"), and other minor actinides ("MA") comprising:
   a transfer canal connected to a solution inlet on
   an electrolytic reduction unit that is structurally integrated with a main body casing and a rotor casing of a centrifugal extraction unit, connected to a feed port to the centrifugal extraction unit comprising a mixing space, a rotor casing, and separate discharge channels for a low density solvent phase and a higher density aqueous phase;
   wherein the transfer canal is configured to feed an aqueous nitric acid solution containing U, Pu, fission products and minor actinides including Np, Am, and Cm via the solution inlet to the electrolytic reduction unit;
   wherein the electrolytic reduction unit is configured to receive the aqueous nitric acid solution via the solution inlet, comprises corrosion-resistant electrodes configured to electrolytically reduce Pu contained in the aqueous nitric acid solution to a valence of 3 without separating it from the aqueous nitric acid solution, and configured to feed the electrolytically reduced aqueous nitric acid solution to the centrifugal extraction unit;
   wherein the centrifugal extraction unit comprises a main body casing forming an outer shell that houses a rotor casing and contains a mixing space defined by the outer wall of the rotor casing and the inner wall of the main body casing;
   wherein the mixing space is configured to mix the reduced aqueous nitric acid solution with a phase-separating extraction solvent comprising tributyl phosphate diluted by dodecane, and wherein the centrifugal extraction unit is configured to centrifugally phase-separate a mixture of the reduced aqueous nitric acid solution and the extraction solvent and to discharge a low density solvent phase containing U via the discharge channel for low density solvent phase and to discharge the reduced aqueous nitric acid solution that retains Pu and minor actinides, including Np, Am and Cm, via the high density discharge channel.

2. The apparatus of claim 1, wherein the main body casing of the centrifugal extractor is negatively-charged and the rotor casing of the centrifugal extractor is positively-charged.

3. The apparatus of claim 1, wherein the main body casing of the centrifugal extractor is positively-charged and the rotor casing of the centrifugal extractor is negatively-charged.

4. A method for reprocessing a spent nuclear fuel comprising:
   dissolving spent nuclear fuel in an aqueous nitric acid solution,
   feeding said dissolved spent nuclear fuel into the transfer canal of the apparatus of claim 1; and
   separating and recovering nuclides contained in the resulting fuel solution by solvent extraction in said apparatus.

5. A method for reprocessing a spent nuclear fuel comprising:
   dissolving spent nuclear fuel in an aqueous nitric acid solution,
   feeding said dissolved spent nuclear fuel into the transfer canal of the apparatus of claim 2; and
   separating and recovering nuclides contained in the resulting fuel solution by solvent extraction in said apparatus.

6. A method for reprocessing a spent nuclear fuel comprising:
   dissolving spent nuclear fuel in an aqueous nitric acid solution,
   feeding said dissolved spent nuclear fuel into the transfer canal of the apparatus of claim 3; and
   separating and recovering nuclides contained in the resulting fuel solution by solvent extraction in said apparatus.

* * * * *